United States Patent Office 3,010,783
Patented Nov. 28, 1961

3,010,783
PREPARATION OF MONOBROMODECABORANE
Sheldon L. Clark, Buffalo, and Delmer A. Fidler, Niagara Falls, N.Y., assignors to Olin Mathieson Chemical Corporation, a corporation of Virginia
No Drawing. Filed May 1, 1958, Ser. No. 733,243
1 Claim. (Cl. 23—14)

This invention relates to a method for the manufacture of monobromodecaborane of the formula $B_{10}H_{13}Br$. Monobromodecaborane is a useful ingredient in solid propellant compositions when admixed with suitable oxidizer salts, such as various perchlorates or ammonium nitrate, as is more particularly described in the application of Murray S. Cohen and Carl E. Pearl, Serial No. 733,241, filed May 1, 1958.

Monobromodecaborane can be prepared in accordance with this invention by reacting ethylene bromide and decaborane while the reaction mixture contains a suitable amount of ferric chloride as a catalyst. The relative amounts of reactants utilized in carrying out the reaction can be varied considerably, but generally the molar ratio of the ethylene bromide to decaborane will be within the range from 0.1:1 to 2:1. Furthermore, the amount of catalyst present in the reaction mixture is subject to considerable variation, but preferably from 0.1 to one mole of the catalyst per mole of decaborane is present in the reaction mixture. The temperature used in carrying out the reaction is preferably within the range from 75° C. to 200° C., although somewhat higher and somewhat lower temperatures can also be utilized, if desired.

The following examples illustrate the invention.

*Example I*

Decaborane, 24.4 grams (0.2 mole) and ferric chloride, 9.6 grams (0.06 mole), were placed in a 200 ml. flask fitted with an addition funnel, magnetic stirrer and reflux condenser. The system was flushed with nitrogen and the mixture heated until molten, the temperature being approximately 120° C. Ethylene bromide, 18.8 grams (0.1 mole), was then added dropwise over a period of 20 minutes. The mixture was gradually heated to 156° C. over an additional 50 minutes. The evolution of hydrogen bromide ceased upon the termination of the ethylene bromide addition. The reaction mixture was cooled to room temperature, hydrolyzed by pouring into ice water and the aqueous solution extracted with benzene. The benzene was removed under reduced pressure and the remaining material distilled.

Distillation yielded 17 grams (29.5 percent conversion) of unreacted decaborane. A liquid boiling at 84 to 86° C. at an absolute pressure of 0.01 mm. of mercury and weighing 1.2 grams was also obtained. This liquid was recrystallized from n-pentane and 1.0 gram of white crystalline solid, melting at 55 to 58° C., was obtained. An elemental analysis of this material showed that it contained 53.3, 52.1 weight percent boron and 37.8 percent bromine. The solid had an average molecular weight of 196 (191, 200). The infrared analysis showed that the material was monobromodecaborane of the formula $B_{10}H_{13}Br$. The calculated elemental analyses for monobromodecaborane are 53.8 weight percent of boron and 39.8 weight percent of bromine.

*Example II*

In a manner similar to that of Example I, 0.2 gram mole of decaborane and 0.1 gram mole of ethylene bromide were reacted while in admixture with 0.026 gram mole of ferric chloride at a temperature of 120° C.–144° C. for a period of 197 minutes. After this had been done, the reaction mixture was cooled to room temperature, hydrolyzed by pouring it into ice water and the resulting aqueous solution was extracted with benzene. The benzene was removed under reduced pressure and the remaining material was distilled.

In the distillation, 15.2 grams of decaborane were recovered. In addition, there was recovered 3 grams of liquid condensate which had a boiling point above 80° C. at an absolute pressure of $5 \times 10^{-2}$ mm. of mercury. During the distillation resulting in the recovery of the three grams of liquid, a portion of the liquid condensate tended to solidify and a small amount of solids was obtained. The liquid distillate containing the solids was admixed with a portion of molar pentane. A white, insoluble solid product was present and this was filtered off and sucked dry. The solid weighed 0.5 gram, melted at 147° C.–151° C., and analyzed 64.98, 65.98 weight percent boron and 27.6 weight percent bromine. The normal pentane filtrate was cooled to −78° C., resulting in the formation of 0.3 gram of solid monobromodecaborane melting at 54° C.–58° C. and analyzing 58.41, 59.88 weight percent boron and 33.9 weight percent bromine. Infrared analysis showed this material to be monobromodecaborane.

What is claimed is:

A method for the manufacture of monobromodecaborane of the formula $B_{10}H_{13}Br$ which comprises reacting decaborane and ethylene bromide at a temperature within the range from 75° C. to 200° C. while the reaction mixture contains a catalytic amount of ferric chloride, and separating monobromodecaborane from the reaction mixture.

References Cited in the file of this patent

Schlesinger et al.: "Chemical Reviews," vol. 31, pp. 10, 11, No. 1, Sieg., 1942.
Hurd: "Chemistry of the Hydrides," pp. 81–83, John Wiley and Sons (1952).
Stone: "Quarterly Review," vol. 9, No. 2, pp. 176 (1955).